(12) United States Patent
Mandayam et al.

(10) Patent No.: US 7,796,582 B2
(45) Date of Patent: *Sep. 14, 2010

(54) METHOD AND APPARATUS FOR SUPPORTING ACCESS NETWORK (AN) AUTHENTICATION

(75) Inventors: Jayanth Mandayam, San Diego, CA (US); Jeffrey Alan Dyck, San Diego, CA (US); Marcello Lioy, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/935,372

(22) Filed: Nov. 5, 2007

(65) Prior Publication Data

US 2008/0049680 A1    Feb. 28, 2008

Related U.S. Application Data

(63) Continuation of application No. 10/406,708, filed on Apr. 2, 2003, now Pat. No. 7,308,260.

(51) Int. Cl.
*G06F 15/16* (2006.01)
*H04L 12/66* (2006.01)
*H04W 4/00* (2009.01)

(52) U.S. Cl. .................... 370/352; 709/227; 455/435.1

(58) Field of Classification Search ............. 455/435.1, 455/436, 422, 406, 407, 408, 410, 411, 414.1; 709/228–229, 249, 227, 29; 370/352, 211, 370/235, 230, 446, 441, 338, 339, 349, 331
See application file for complete search history.

(56) References Cited

U.S. PATENT DOCUMENTS

| | | | |
|---|---|---|---|
| 4,901,307 A | 2/1990 | Gilhousen | |
| 5,103,459 A | 4/1992 | Gilhousen | |
| 6,956,846 B2 | 10/2005 | Lewis et al. | |
| 7,133,386 B2 | 11/2006 | Holur et al. | |
| 7,308,260 B2 * | 12/2007 | Mandayam et al. | 455/435.1 |
| 7,346,684 B2 | 3/2008 | Borella | |
| 2002/0067707 A1 | 6/2002 | Morales et al. | |

FOREIGN PATENT DOCUMENTS

EP    1002690    5/2000

OTHER PUBLICATIONS

International Search Report - PCT/US04/010306 - ISA/US - Feb. 25, 2005.
Written Opinion - PCT/US04/010306-ISA/US - Feb. 25, 2005.
International Preliminary Report on Patentability - PCT/US04/010306 - IPEA/US - Nov. 9, 2005.

* cited by examiner

*Primary Examiner*—Melody Mehrpour
(74) *Attorney, Agent, or Firm*—Won Tae C. Kim (57) ABSTRACT

Methods and apparatus are presented herein for allowing a keyless access terminal (AT) to access a packet serving data node (PSDN) over a service network stream without deactivating the authentication functions of the authentication network stream.

15 Claims, 4 Drawing Sheets

METHOD AND APPARATUS FOR SUPPORTING ACCESS NETWORK (AN) AUTHENTICATION

CLAIM OF PRIORITY UNDER 35 U.S.C. §120

The present Application for Patent is a Continuation of patent application Ser. No. 10/406,708 entitled "Method and Apparatus for Supporting Access Network (AN) Authentication" filed Apr. 2, 2003, now allowed, and assigned to the assignee hereof and hereby expressly incorporated by reference herein.

BACKGROUND

1. Field

The present invention relates generally to wireless communication networks and packet switched data networks, and more specifically, to supporting authentication of wireless communication devices accessing the services of packet switched data networks.

2. Background

The field of wireless communications has many applications including, e.g., cordless telephones, paging, wireless local loops, personal digital assistants (PDAs), Internet telephony, and satellite communication systems. A particularly important application is cellular telephone systems for remote subscribers. As used herein, the term "cellular" system encompasses systems using either cellular or personal communications services (PCS) frequencies. Various over-the-air interfaces have been developed for such cellular telephone systems including, e.g., frequency division multiple access (FDMA), time division multiple access (TDMA), and code division multiple access (CDMA). In connection therewith, various domestic and international standards have been established including, e.g., Advanced Mobile Phone Service (AMPS), Global System for Mobile (GSM), and Interim Standard 95 (IS-95). IS-95 and its derivatives, IS-95A, IS-95B, ANSI J-STD-008 (often referred to collectively herein as IS-95), and proposed high-data-rate systems are promulgated by the Telecommunication Industry Association (TIA) and other well-known standards bodies.

Cellular telephone systems configured in accordance with the use of the IS-95 standard employ CDMA signal processing techniques to provide highly efficient and robust cellular telephone service. Exemplary cellular telephone systems configured substantially in accordance with the use of the IS-95 standard are described in U.S. Pat. Nos. 5,103,459 and 4,901,307, which are assigned to the assignee of the present invention and incorporated by reference herein. An exemplary system utilizing CDMA techniques is the cdma2000 ITU-R Radio Transmission Technology (RTT) Candidate Submission (referred to herein as cdma2000), issued by the TIA. The standard for cdma2000 is given in the draft versions of IS-2000 (cdma2000 1xEV-DV) and IS-856 (cdma2000 1xEV-DO) and has been approved by the TIA. Another CDMA standard is the W-CDMA standard, as embodied in 3rd Generation Partnership Project "3GPP", Document Nos. 3G TS 25.211, 3G TS 25.212, 3G TS 25.213, and 3G TS 25.214. The W-CDMA standard is in the process of incorporation into a GSM-based system known as Universal Mobile Telecommunications Systems (UMTS).

The telecommunication standards cited above are examples of only some of the various communications systems that can be implemented. One general category of standards is referred to as "Third Generation" or "3G," of which cdma2000 and W-CDMA are both members. These 3G standards are directed towards increased data rates, which will support increased user numbers and data-intensive applications.

Given the growing demand for wireless data applications, the need for very efficient wireless data communication systems has become increasingly significant. One such wireless data application is the transmission of data packets that originate or terminate at packet switched data networks. Various protocols exist for transmitting packetized traffic over packet switched data networks so that information arrives at its intended destination. One such protocol is "The Internet Protocol," RFC 791 (September 1981). The internet protocol (IP) breaks up messages into packets, routes the packets from a sender to a destination, and reassembles the packets into the original messages at the destination. The IP protocol requires that each data packet begins with an IP header containing source and destination address fields that uniquely identifies host and destination computers.

The transmission of data packets from the IP network over a wireless communication network or from the wireless communication network over the IP network can be accomplished by adherence to a set of protocols, referred to as a protocol stack. Typically, a wireless communication device communicates with a base station (BS) and/or packet data serving node (PDSN) through an interface. A wireless communication device may be the origination or the destination of the IP packet, or alternatively, the wireless communication device may be a transparent link to an electronic device. In either case, payload information is broken into packets wherein header information is added to each packet. The IP header sits on top of the PPP layer, which sits on the RLP layer, which sits on top of the physical layer. The RLP layer is the Radio Link Protocol layer, which is responsible for retransmitting packets when a transmission error occurs. The PPP layer is the Point-to-Point protocol layer, which is an encapsulation protocol for transporting IP traffic over point-to-point links. The packets are transported over the air to a BS/PDSN, whereupon the packet is subsequently sent over the IP network.

There are numerous difficulties that abound when attempting to wirelessly transfer data that originates or terminates in wired environments. One such difficulty is the authentication of the wireless terminals that attempts to access such packet data services.

SUMMARY

Methods and apparatus are presented herein to address the above stated difficulties. In one aspect, a method is presented for establishing a Point-to-Point session for a wireless communication device on a service network stream without deactivating authentication functions of an authentication network stream, the method comprising: transmitting a message on the authentication network stream from the wireless communication device to an access network entity; transmitting an access request message from the access network entity to a server, wherein the access request message is for allowing the wireless communication device access to the service network stream; determining whether the wireless communication device should participate in a key provisioning process; transmitting an access message from the server to the access network entity if the wireless communication device requires key provisioning; providing access to the wireless communication device on the service network stream upon receipt of the access message; and provisioning the wireless communication device with a key over the service network stream.

In another aspect, a system is presented for supporting authentication of access terminals attempting to access a packet data services network, the system comprising: an access network (AN); a packet data serving node (PDSN) communicatively coupled to the AN and the packet data services network; and a server communicatively coupled to the AN and the PDSN and configured to determine whether to authenticate an access terminal (AT) in communication with the AN in order to communicate with the PDSN, wherein determining whether to authenticate the AT in communication with the AN comprises: determining whether an access request message associated with the AT indicates origination at the AN; and determining whether the AT is newly activated or requires a new key.

In another aspect, a system is presented for supporting authentication of access terminals attempting to access a packet data services network, the system comprising: a server configured with user attributes and authentication keys; a packet data serving node (PDSN) communicatively coupled to the server and the packet data services network; and an access network (AN) communicatively coupled to the PDSN and the server, and configured to determine whether to authenticate a keyless access terminal (AT) for access to the PDSN, wherein the AN authenticates the keyless access terminal if the AN receives an Access Reject message that includes a Mobile IP Key Update (MKU) attribute from the server.

In another aspect, an apparatus is presented for supporting authentication of access terminals attempting to access a packet data services network, the apparatus comprising: at least one memory element; and at least one processing element configured to execute a set of instructions stored on the at least one memory element, the set of instructions for: determining whether an access request message associated with an access terminal (AT) indicates origination at an access network (AN); determining whether the AT is keyless; and if the access request message indicates origination at an AN and the AT is keyless, then allowing the AN to authenticate the AT.

In another aspect, an apparatus at an access network (AN) is presented for supporting authentication of access terminals attempting to access a packet data services network, the apparatus comprising: at least one memory element; and at least one processing element configured to execute a set of instructions stored on the at least one memory element, the set of instructions for: transmitting an Access Request message associated with an access terminal (AT) to a server; determining whether an Access Reject message received from the server includes a Mobile IP Key Update (MKU) attribute; and if the received Access Reject message includes an MKU attribute, then authenticating the AT for access to a packet data serving node (PDSN).

DETAILED DESCRIPTION

Figure 1:
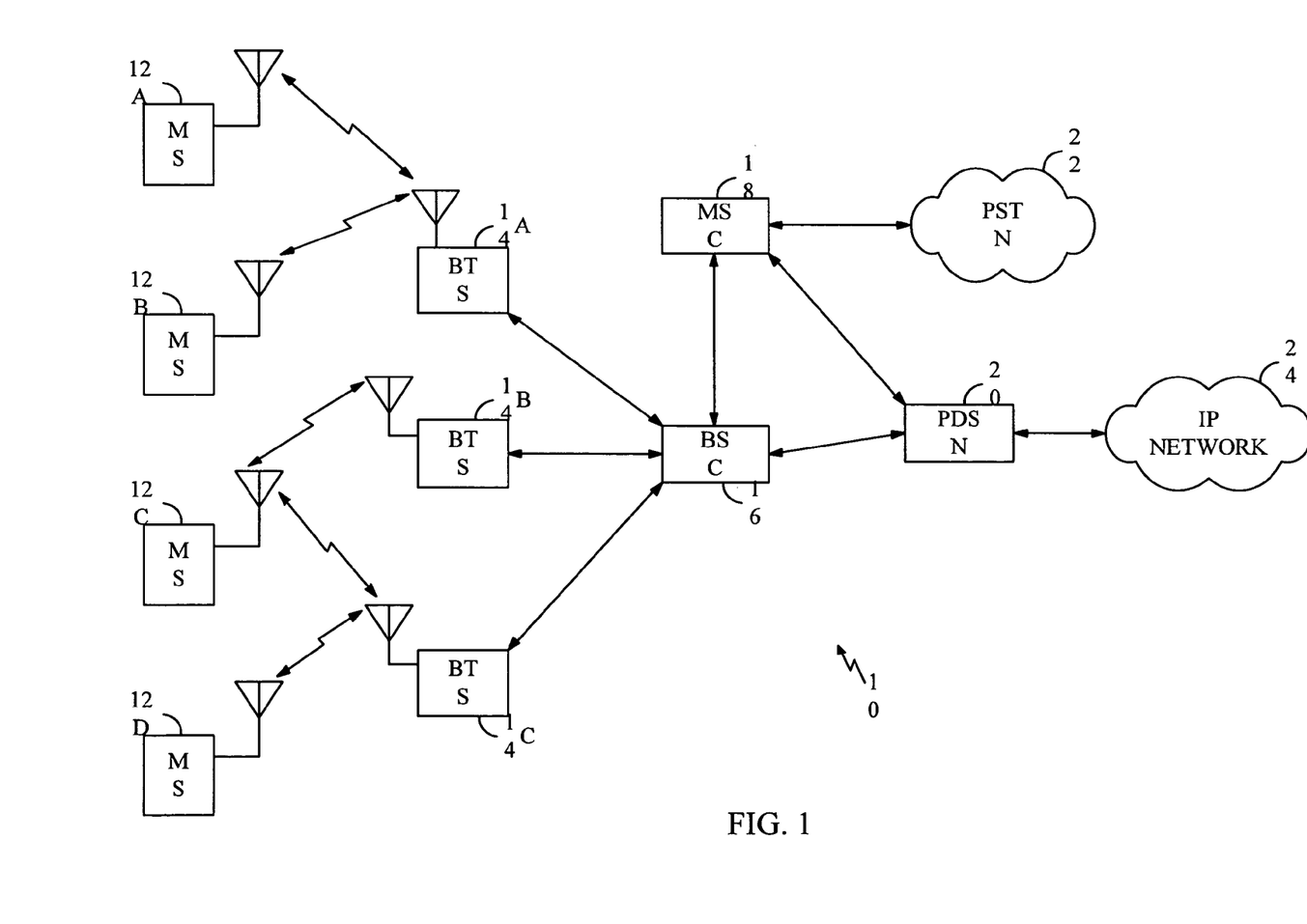
FIG. 1 is a diagram of a wireless communication network.

As illustrated in FIG. 1, a wireless communication network 10 generally includes a plurality of access terminals (also called remote stations, mobile stations, subscriber units, or user equipment) 12a-12d, a plurality of base stations (also called base station transceivers (BTSs) or Node B). 14a-14c, a base station controller (BSC) (also called radio network controller or packet control function 16), a mobile switching center (MSC) or switch 18, a packet data serving node (PDSN) or internetworking function (IWF) 20, a public switched telephone network (PSTN) 22 (typically a telephone company), and a packet switched data network 24 (typically an Internet Protocol (IP) network). For purposes of simplicity, four access terminals 12a-12d, three base stations 14a-14c, one BSC 16, one MSC 18, and one PDSN 20 are shown. It would be understood by those skilled in the art that there could be any number of access terminals 12, base stations 14, BSCs 16, MSCs 18, and PDSNs 20.

In one embodiment the wireless communication network 10 is a packet data services network. The access terminals 12a-12d may be any of a number of different types of wireless communication device such as a portable phone, a cellular telephone that is connected to a laptop computer running IP-based Web-browser applications, a cellular telephone with associated hands-free car kits, a personal data assistant (PDA) running IP-based Web-browser applications, a wireless communication module incorporated into a portable computer, or a fixed location communication module such as might be found in a wireless local loop or meter reading system. In the most general embodiment, access terminals may be any type of communication unit.

The access terminals 12a-12d may advantageously be configured to perform one or more wireless packet data protocols such as described in, for example, the EIA/TIA/IS-707 standard. In a particular embodiment, the access terminals 12a-12d generate IP packets destined for the IP network 24 and encapsulates the IP packets into frames using a point-to-point protocol (PPP).

In one embodiment the IP network 24 is coupled to the PDSN 20, the PDSN 20 is coupled to the MSC 18, the MSC is coupled to the BSC 16 and the PSTN 22, and the BSC 16 is coupled to the base stations 14a-14c via wirelines configured for transmission of voice and/or data packets in accordance with any of several known protocols including, e.g., E1, T1, Asynchronous Transfer Mode (ATM), Internet Protocol (IP), Point-to-Point Protocol (PPP), Frame Relay, High-bit-rate Digital Subscriber Line (HDSL), Asymmetric Digital Subscriber Line (ADSL), or other generic digital subscriber line equipment and services (xDSL). In an alternate embodiment, the BSC 16 is coupled directly to the PDSN 20, and the MSC 18 is not coupled to the PDSN 20.

During typical operation of the wireless communication network 10, the base stations 14a-14c receive and demodulate sets of reverse link signals from various access terminals 12a-12d engaged in telephone calls, Web browsing, or other data communications. Each reverse link signal received by a given base station 14a-14c is processed within that base station 14a-14c. Each base station 14a-14c may communicate with a plurality of access terminals 12a-12d by modulating and transmitting sets of forward link signals to the access terminals 12a-12d. For example, as shown in FIG. 1, the base station 14a communicates with first and second access terminals 12a, 12b simultaneously, and the base station 14c communicates with third and fourth access terminals 12c, 12d simultaneously. The resulting packets are forwarded to the BSC 16, which provides call resource allocation and mobility management functionality including the orchestration of soft handoffs of a call for a particular access terminal 12a-12d from one base station 14a-14c to another base station 14a-14c. For example, an access terminal 12c is communicating with two base stations 14b, 14c simultaneously. Eventually, when the access terminal 12c moves far enough away from one of the base stations 14c, the call will be handed off to the other base station 14b.

If the transmission is a conventional telephone call, the BSC 16 will route the received data to the MSC 18, which provides additional routing services for interface with the PSTN 22. If the transmission is a packet-based transmission such as a data call destined for the IP network 24, the MSC 18 will route the data packets to the PDSN 20, which will send the packets to the IP network 24. Alternatively, the BSC 16 will route the packets directly to the PDSN 20, which sends the packets to the IP network 24.

In a WCDMA system, the terminology of the wireless communication system components differs, but the functionality is the same. For example, a base station can also be referred to as a Radio Network Controller (RNC) operating in a UMTS Terrestrial Radio Access Network (U-TRAN).

The forward link from the base station to an access terminal operating within the range of the base station can comprise a plurality of channels. The reverse link from an access terminal to a base station also comprises a plurality of channels.

Each channel carries different types of information to the target destination. For example, in a cdma2000 1xEV-DV system, voice traffic is carried on fundamental channels, and data traffic is carried on supplemental channels or packet data channels. Supplemental channels are typically enabled for durations of time in the order of seconds and seldom change modulation and coding formats, whereas packet data channels are dynamically changed from one 20 ms interval to another.

In a typical communication system, a "source" generates a stream of information bits representing, for example, voice traffic or data traffic. This stream of bits is subdivided and grouped, various control bits are appended, and the result is packed into a suitable format for transmission. Voice traffic and data traffic are typically encoded, modulated, and spread in accordance with one or more formats before transmission on either the forward or reverse links. In a CDMA system, the transmission channel format ultimately depends upon the type of channel over which the voice traffic and data traffic are being transmitted and the condition of the channel, which can be described in terms of noise and interference.

In the various existing communication systems, different nomenclature exists for the various formats in which voice and data traffic can be transmitted, such as, e.g. frames, packets, and subpackets. The scope of the embodiments described herein extends to all wireless communication systems using any of the various transmission formats. However, for the purpose of illustrative ease, the term "packets" will be used herein to describe both the transmission channel format in which traffic is carried and the structure of the traffic.

Moreover, it should be noted that the "packets" of the CDMA system are structurally distinct from the "packets" of the packet switched data network. Both are units describing the format in which data is transmitted, but one is optimized for wireless networks and the other is optimized for a packet switched data network. For example, a data packet from an IP source would contain a header portion and a data portion. However, a data packet for transmission over the air carries data that has been encoded and modulated, and probably subjected to symbol repetition before being packed into a packet. Hence, a packet from a packet switched data network will have to be reformatted for use on the wireless network. In the embodiments described herein and in the art, the meaning of the word "packet" is to be inferred by the usage of the word.

As discussed above for the wireless communication network, bits are convolutionally or turbo encoded, repeated, and punctured to produce a sequence of binary code symbols. The resulting code symbols are interleaved to obtain modulation symbols. The modulation symbols are then Walsh covered and combined with a pilot sequence on the orthogonal-phase branch, spread with a pseudorandom noise (PN) sequence, baseband filtered, and modulated onto the transmit carrier signal.

In some CDMA systems, a source may generate "logical" channels for transmission over the physical channels described above. A logical channel is a stream of bits associated with a specific application that may be multiplexed with other logical channels, each comprising bit streams associated with other applications. The multiplexed logical channels are then prepared for transmission over a physical channel in the manner described above. In the cdma2000 1xEV-DO system promulgated in aforementioned IS-856, the logical channels are referred to as "streams" and are defined by protocols of the Stream Layer.

Since the subject matter of the embodiments is directed towards mobile IP telephony, the terminology of RFC 2002 (October 1996) will also be used forthwith. The protocol promulgated in this document enables a mobile communication device to change the point of attachment to the Internet without having to change the IP address of the device. Namely, RFC 2002 describes a registration scheme that informs a home agent of the location of a mobile communication device so that the home agent can route data packets through foreign agents. A "home agent" is the infrastructure element that processes IP packets at the home system of the access terminal. A "foreign agent" is the infrastructure element that services the access terminal at a visited system. The access terminal is also referred to as a "mobile node". In reference to FIG. 1, the functions of a foreign agent and/or home agent can be accomplished by a BSC 16 in a visited network or a BSC 16 in the home network. Authentication, authorization, and accounting functions are usually performed by a server, which is referred to as an Accounting, Authorization, and Accounting (AAA) Server. The AAA server is communicatively coupled to either a PDSN or a BSC.

In cdma2000 1xEV-DO, hereinafter referred to as EV-DO, the wireless communication system entities of FIG. 1 are conceptually simplified to an access terminal and an access network. An access terminal (AT) is any device that allows a user to access a packet switched data network through the EV-DO wireless access network. The access network (AN) comprises any network equipment/entity that provides data connectivity between a packet switched data network and access terminals.

Figure 2:
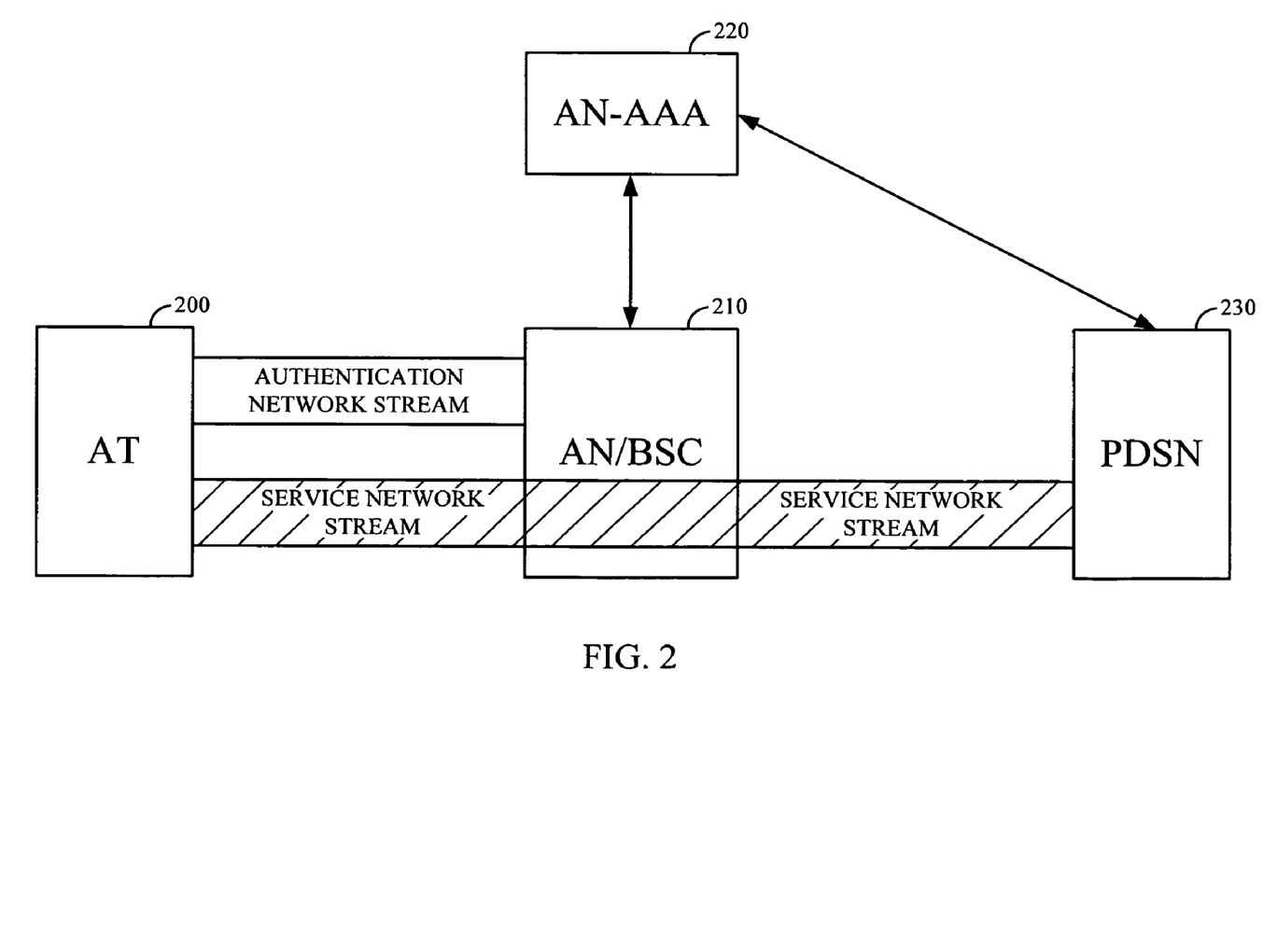
FIG. 2 is a diagram of the data connectivity between an Access Terminal (AT), an Access Network (AN), an AN-Authentication, Authorization, and Accounting (AN-AAA) server, and a PDSN.

FIG. 2 is a diagram of the data connectivity between an AT 200, an AN 210, an AN-AAA server 220, and a PDSN 230. A communication session is established between the AT 200 and the AN 210 when the AT 200 desires access to the PDSN 230. The session is implemented according to PPP protocols and is referred to as the authentication network stream. The AN 210 communicates with the AN-AAA server 220 in order to determine whether to allow the AT 200 access to the PDSN 230. Based upon the authentication information conveyed within the authentication network stream, the AN 210 transparently passes a service network stream between the AT 200 and the PDSN 230. The PDSN 230 further communicates with the AN-AAA server 220 in order to determine whether to allow the AT 200 access to a packet switched data network (not shown). Based upon the authentication information conveyed within the service network stream, the PDSN 230 allows IP traffic between the packet switched data network (not shown) and the AT 200.

On the authentication network stream, authentication is performed using, for example, CHAP (Challenge Handshake Authentication Protocol). Other authentication protocols may be used without undue experimentation in the described embodiments, but for illustrative ease, CHAP will be described herein. On the service network stream, authentication may be performed using CHAP, Mobile IP authentication, or PAP (Password Authentication Protocol).

Note that in the EV-DO system, the authentication network stream and the service network stream are logical channels that are multiplexed together over a physical, over-the-air, transmission channel.

A problem arises due to the need to authenticate the AT with the AN for the initial registration on an EV-DO network. Authentication passwords/keys are provisioned at the AAA using the service network stream. In order to participate in the key update procedure, the AT would have to be passed by the AN, which acts as a "gatekeeper" who relays messages between the AT and the PDSN. However, a newly activated AT does not have authentication keys. There are no keys associated with the newly activated AT located at the AN-AAA server during the initial registration. The AN-AAA server will not provide permission to the AN for the AT, hence, the AN will not authenticate the AT. In other words, the AT needs a key in order to be provisioned with a key. This problem also arises when the service provider wishes to provision an already activated AT with new keys. In order to make use of the key update procedure, the already activated AT would need to access the authentication network stream. However, the authentication network stream is already "keyed" to the new key and not the old key that is held by the already activated AT.

The current solution to the problem is to deactivate the authentication functions of the authentication network stream, which is problematic. Deactivating the authentication functions of the authentication network stream would leave the network vulnerable to "denial of service" attacks, wherein any rogue AT would be able to establish a PPP session and keep it open for an indefinite period of time, without being authenticated. The embodiments that are presented herein are for establishing a PPP session on the service network stream without deactivating the authentication functions of the authentication network stream.

In the embodiments described below, methods and apparatus are presented to trigger a Mobile IP Key Update (MKU) procedure over the service network stream without deactivating the authentication network stream. In one embodiment, the MKU procedure is triggered by actions performed by the AN-AAA server. In another embodiment, the MKU procedure is triggered by actions performed by the AN.

Figure 3:
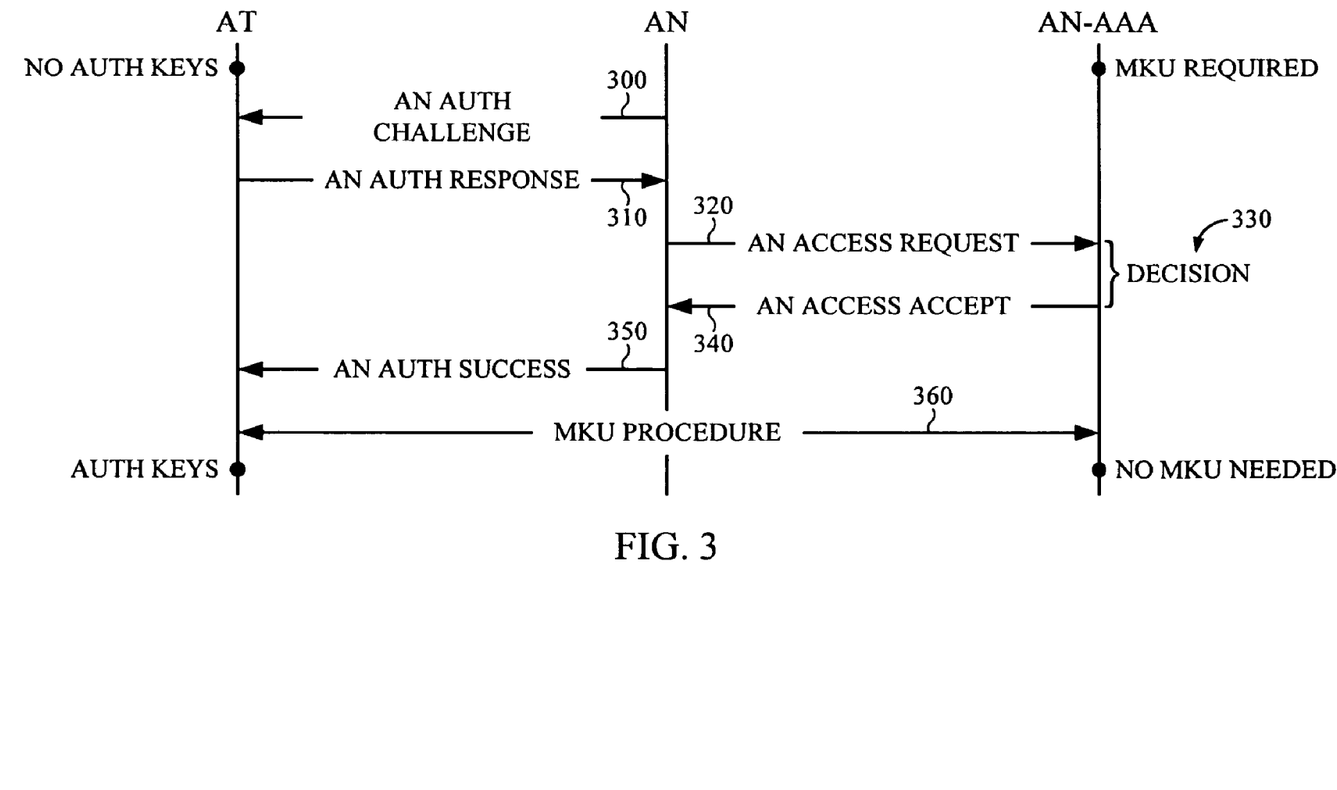
FIG. 3 is a diagram illustrating the communication flow for authentication over the authentication network stream.

FIG. 3 is a flowchart illustrating the embodiment wherein the AN-AAA server triggers the MKU procedure. In this embodiment, the AN-AAA server is programmed with the information that the AT is newly activated or is an already activated unit requiring a new key. (In the parlance of Mobile IP, the AT is also known as the mobile node (MN)). At step 300, the AN attempts to establish an authentication network stream with the AT, using an authentication protocol such as, for example, CHAP.

At step 310, the AT sends a user identifier, which may include, but is not limited to, a mobile node identifier MN ID or a network access identifier NAI, as a part of a response to the challenge from the AN. The response usually comprises the user identifier and a random value retrieved from the challenge, wherein the response is usually concealed using a hashing function. RFC 1994 (August 1996) promulgates the use of a one-way hashing function referred to as MD5 in the CHAP authentication procedure.

At step 320, the AN transmits an "Access Request" (ARQ) message to the AN-AAA server. In this embodiment, the ARQ message should convey characterizing information as to the originator of the ARQ message. In other words, information that the originator of the ARQ message is an AN (as opposed to a PDSN or another AAA server) should be included with the ARQ message. In TIA-878, the "Inter-Operability Specification (IOS) for High Rate Packet Data (HRPD) Network Access Interfaces," an HRPD Access Authentication field indicating whether the ARQ message is in the context of access authentication, is optional. In the context of the current embodiment, this optional field is used to decide whether to allow access to the service network stream.

At step 330, the AN-AAA server receives the AN identifier and the ARQ message containing the CHAP response from the AT, and makes a decision based on two conditions. The conditions are that the user attribute is associated with a newly activated status (or otherwise requires key provisioning) and that the ARQ message originated with an AN.

At step 340, if the two criteria are met, then the AN-AAA server transmits an "Access Accept" (AA) message to the AN. Otherwise, an "Access Reject" (AR) message is transmitted to the AN.

At step 350, the AN returns an indication of successful authentication if an AA message is received from the AN-AAA server, else the AN returns an indication of failed authentication if an AR message is received from the AN-AAA server. If an AA message is received, then the program flow proceeds to step 360, else the program flow ends with a failed authentication of the AT.

At step 360, the AN relays messages between the AT and the PDSN, whereupon an MKU procedure is triggered by the AN-AAA server in communication with the PDSN. At the end of a successful MKU process, the AN-AAA and the AT will have a common set of shared secrets.

The above program flow allows the AT to have access to the service network stream in order to be provisioned with authentication information. In order for the program flow to achieve this purpose, the AN-AAA server should have information indicating that the AT is a newly activated unit or requires key provisioning. Moreover, the AN-AAA server should have information regarding the originator of the ARQ message. The processing and memory elements of the AN-AAA server should be configured to use the above two criteria to determine whether to send an AA message to the AN, in spite of a lack of a password/key to the authentication procedures over the authentication network stream.

Figure 4:
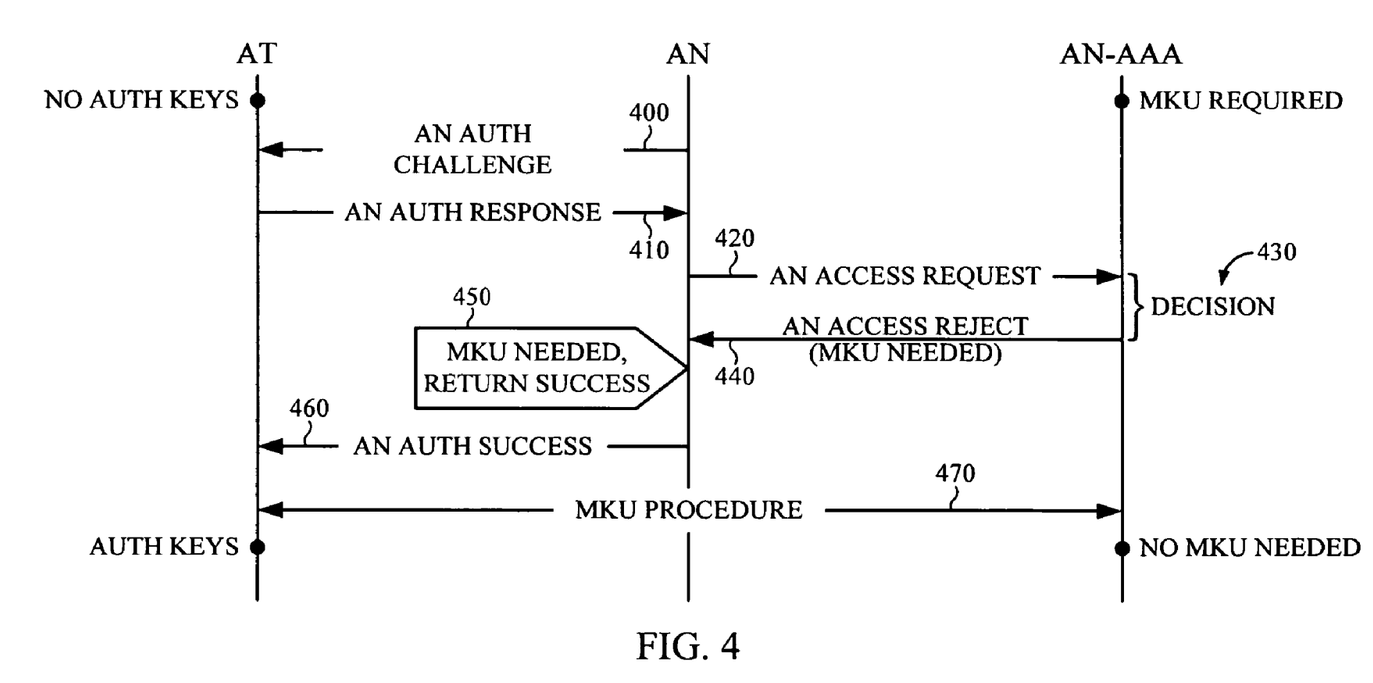
FIG. 4 is a diagram illustrating another communication flow for authentication over the authentication network stream.

FIG. 4 is a flowchart illustrating the embodiment wherein the AN triggers the MKU procedure. At step 400, the AN attempts to establish an authentication network stream with the AT, using an authentication protocol such as CHAP.

At step 410, the AT sends a user attribute as a response to the challenge from the AN.

At step 420, the AN transmits an "Access Request" (ARQ) message to the AN-AAA server.

At step 430, the AN-AAA server receives the ARQ message and determines that the AT is a newly activated unit or requires key provisioning. The program flow then proceeds to step 440.

At step 440, the AN-AAA server transmits an "Access Reject" (AR) message that includes a "MKU Update Required" attribute to the AN. Note that the previous embodiment required the AN_AAA server to alter its behavior based on the two described criteria, whereas this embodiment does not require any change in the AN-AAA server configuration.

At step 450, the AN receives the AR message with the MKU attribute, the arrival of both being a new set of criteria for allowing the AT to access the PDSN without having the appropriate authentication information. Memory and processing elements in the AN are configured to interpret the arrival of a AR message that includes the MKU attribute as an indication that the AT is newly activated or in need of a key provisioning. Either state is referred to as "keyless" herein. Accordingly, at step 460, the AN determines that a MKU update is needed for the keyless AT and returns an indication of successful authentication to the AT.

At step 470, the AN relays messages between the AT and the PDSN, whereupon an MKU procedure is triggered by the AN-AAA server in communication with the PDSN. Note that the MKU attribute can be set in the AR message whenever the AN-AAA server determines that the AT is either newly activated or whenever the system provider determines that new passwords/keys should be provisioned to some or all of the access terminals. Hence, this embodiment has the added flexibility of selectively providing key provisioning to already activated access terminals.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. A system for supporting authentication of access terminals attempting to access a packet data services network communicatively coupled to an access network (AN) and a packet data serving node (PDSN), comprising:
a server communicatively coupled to the AN and the PDSN and configured to determine whether to authenticate an access terminal (AT) in communication with the AN in order to communicate with the PDSN, wherein determining whether to authenticate the AT in communication with the AN comprises:
determining whether an access request message associated with the AT indicates origination at the AN; and
determining whether the AT is Newly activated or requires a New key.

2. An apparatus for supporting authentication of access terminals attempting to access a packet data services network, comprising:
at least one memory element; and
at least one processing element configured to execute a set of instructions stored on the at least one memory element, the set of instructions for:
determining whether an access request message associated with an access terminal (AT) indicates origination at an access network (AN);
determining whether the AT is keyless; and
if the access request message indicates origination at an AN and the AT is keyless, then allowing the AN to authenticate the AT.

3. The system of claim 1, wherein the access request message is transmitted by the AN after the AN receives an authentication response from the AT.

4. The system of claim 1, further comprising:
if the server determines that the access request message originated at the AN and the AT is Newly activated or requires a New key, the server is further configured to transmit an access accept message to the AN.

5. The system of claim 4, wherein the AN is further configured to transmit to the AT an authentication success message if the access accept message is received by the AN.

6. The apparatus of claim 2, wherein the access request message is transmitted by the AN after the AN receives an authentication response from the AT.

7. The apparatus of claim 2, wherein if the access request message indicates origination at an AN and the AT is keyless, then allowing the AN to authenticate the AT by transmitting an access accept message to the AN.

8. The system of claim 1, wherein if the access request message does not indicate origination at an AN and the AT is not keyless, then transmitting an access reject message to the AN.

9. An apparatus for supporting authentication of access terminals attempting to access a packet data services network, comprising:
   means for determining whether an access request message associated with an access terminal (AT) indicates origination at an access network (AN);
   means for determining whether the AT is keyless;
   wherein if the access request message indicates origination at an AN and the AT is keyless, then allowing the AN to authenticate the AT.

10. The apparatus of claim 9, wherein the access request message is transmitted by the AN after the AN receives an authentication response from the AT.

11. A machine-readable medium comprising instructions, the instructions when executed by the machine, cause the machine to perform operations comprising:
   determining whether an access request message associated with an access terminal (AT) indicates origination at an access network (AN);
   determining whether the AT is keyless; and
   if the access request message indicates origination at an AN and the AT is keyless, then allowing the AN to authenticate the AT.

12. The machine-readable medium of claim 11, wherein the access request message is transmitted by the AN after the AN receives an authentication response from the AT.

13. A method for supporting authentication of access terminals attempting to access a packet data services network, comprising:
   determining whether an access request message associated with an access terminal indicates origination at an access network;
   determining whether the access terminal is keyless; and
   if the access request message indicates origination at the access network and the access terminal is keyless, then allowing the access network to authenticate the access terminal.

14. The method of claim 13, wherein the access request message is transmitted by the access network after the access network receives an authentication response from the access terminal.

15. The method of claim 13, wherein if the access request message indicates origination at the access network and the access terminal is keyless, then allowing the access network to authenticate the access terminal by transmitting an access accept message to the access network.

\* \* \* \* \*